Figure 1:
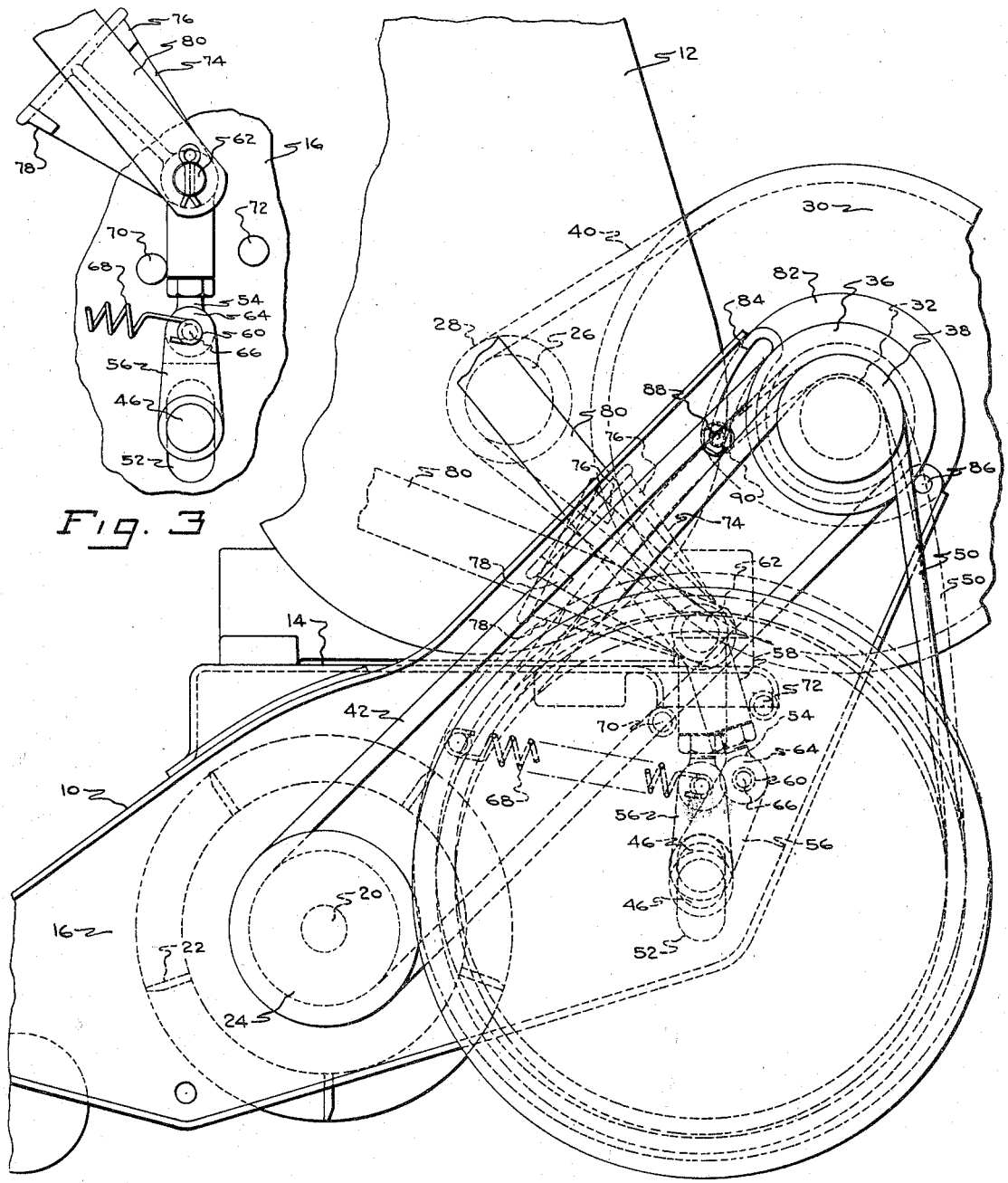

Inventor
TRUMAN B. FUNK
By Beaman + Langford
Attorney

Patented June 24, 1941

2,247,333

UNITED STATES PATENT OFFICE 2,247,333

POWER LAWN MOWER

Truman B. Funk, Jackson, Mich., assignor to "Yard-Man," Inc., Jackson, Mich., a corporation of Michigan Application December 7, 1938, Serial No. 244,314

9 Claims. (Cl. 56—26)

The present invention relates to improvements in power driven lawn mowers, having particular reference to lawn mowers which are manually guided over the ground through an operating or steering member pivoted or otherwise secured at its lower end to the mower chassis. The present invention is deemed to be a modification of the control for selectively driving the ground wheels of the power lawn mower disclosed in my copending application, Serial No. 191,913, filed February 23, 1938, now Patent No. 2,151,659, granted March 21, 1939.

As in the case of my above identified copending application, one of the objects of the present invention is to provide a control for selectively driving the ground wheels, which is simple in operation and construction and permits the control to be effective through manipulation of the steering handle but at the same time does not place any restriction upon or interfere with the usual pivotal action of the steering handle provided in manually propelled lawn mowers for steering purposes.

Another object of the invention resides in the improvement in driving arrangement of the cutting reel and ground wheel, which provides for convenient separate driving of the cutting reel and the ground wheel at such unrelated speeds as may be desired.

A further object resides in providing an improved driving arrangement for the cutting reel and ground wheel of a power lawn mower in which a jack shaft is provided which is driven by the prime mover and off of which the drive for the cutting reel or ground wheels are taken.

Another object is to provide a novel driving arrangement for the cutting reel and ground wheels of a power lawn mower in which a jack shaft driven from the prime mover is provided, the jack shaft being adjustable to tighten driving belts passing over pulleys for driving the cutting reel and ground wheels, and the ground wheels being movable relative to the jack shaft for selectively driving the ground wheels from the jack shaft.

A still further object resides in providing in a power lawn mower in which the ground wheels are bodily shifted relative to the axis of rotation of a power take-off, a belt tightening arrangement for selectively driving ground wheels in which single means are provided for shifting the wheels and locking the same in their shifted position.

A still further object of the invention is to provide mechanism for carrying out the object of the preceding paragraph, which takes the form of a toggle bracket which is rocked from one position to another through a lost motion connection actuated by the steering handle of the lawn mower.

These and other objects and advantages residing in the construction, combination, and arrangement of parts will appear from a consideration of the following specification and as set forth in the annexed claims.

Figure 2:
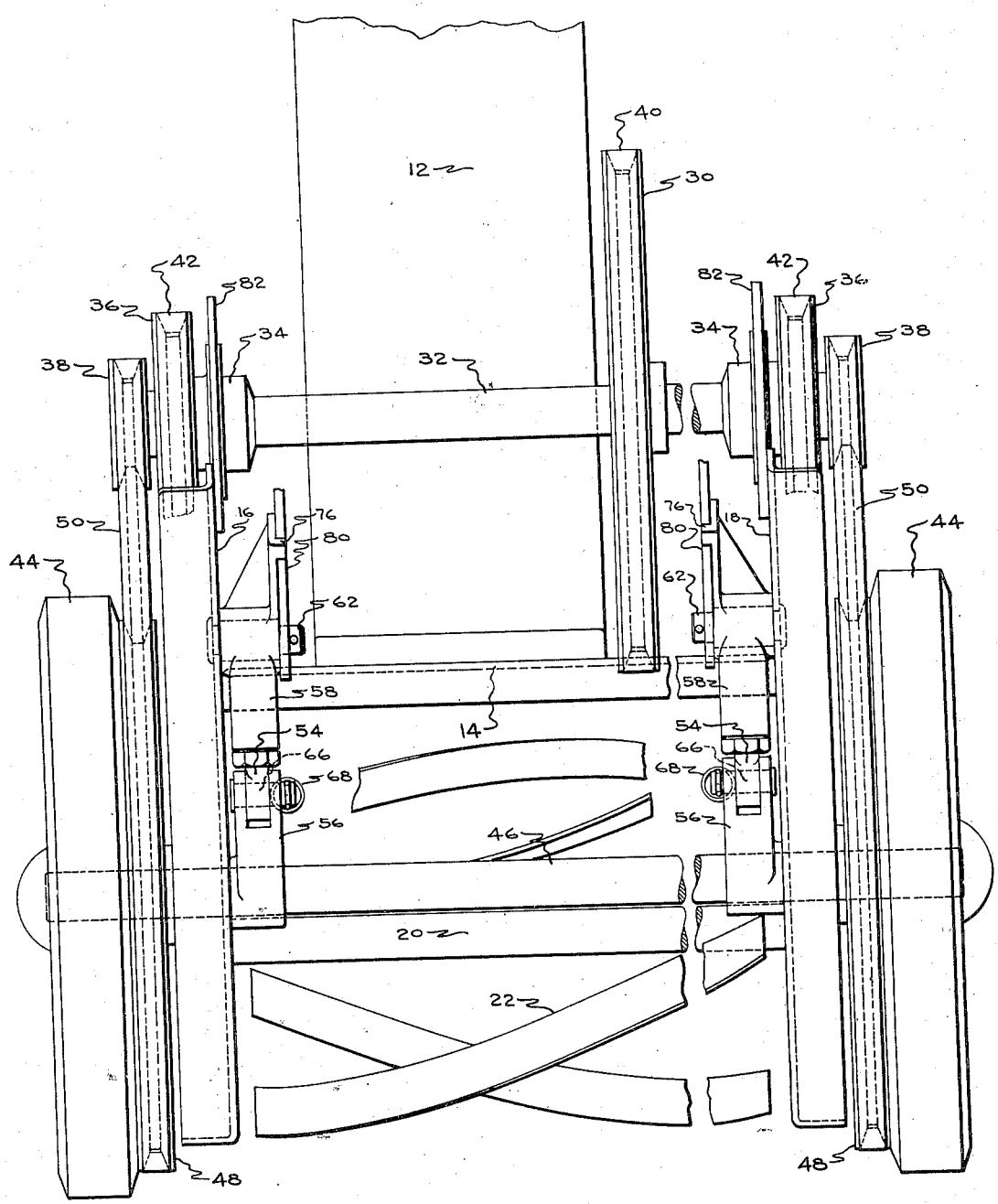

In the drawings,

Fig. 1 is a side elevational view of a power lawn mower embodying the principles of the present invention, Fig. 2 is a front elevational view of the construction shown in Fig. 1, and Fig. 3 is an enlarged detail view of the toggle bracket structure for shifting the ground wheel and operated by the steering handle.

Referring to the drawings, the features of the present invention are shown in connection with a power driven lawn mower generally designated by reference character 10 having a suitable prime mover 12 supported upon a base 14 carried between side frame members 16 and 18. Suitably supported on the side frames 16 and 18 is a rotatable shaft 20 carrying the cutter reel 22, with the opposite ends of the shaft 20 extending through side frames 16 and 18 carrying pulleys 24. The prime mover 12 has a power take-off shaft 26 having a pulley 28 which is in line with a large pulley 30 upon the jack shaft 32 supported in suitable bearings 34 mounted from the side frames 16 and 18. The ends of the jack shaft 32 extend beyond the bearings 34 to carry pulleys 36 and 38. A belt 40 drives the pulley 30 from the pulley 28, while belts 42 passing over the pulleys 36 on the jack shaft 32 and over pulleys 24 on the reel shaft 20 act to drive the reel shaft 20 and the reel 22 mounted thereon.

The ground wheels 44 are mounted in suitable bearings for free rotation upon the shaft 46. Associated with the ground wheels and rotatable therewith as a unit are sheaves 48 adapted to be driven by belts 50 running over the pulley 38. To permit vertical up and down movement of the ground wheel shaft 46, the side frames 16 and 18 have elongated slotted portions 52 through which the shaft 46 extends.

The structure for mounting the ground wheels and for selectively controlling the drive thereof comprises a pair of toggle brackets 54 each having a lower link portion 56 receiving the shaft 46 at its lower end and pivoted to a double-ended lever 58 at 60, the lever 58 in turn being fixedly supported for pivotal movement upon a pin 62 supported from the side frames 16 and 18. The connection between the link 56 and lever 58 is through an adjustable eye-bolt 64. Passing through the eye thereof and the forked upper end of the link 56, as more clearly shown in Fig. 3, is a pin 66 joining the two parts together for pivotal movement and also acting to anchor one end of the spring 68, which tends to straighten out the toggle joint and to hold the same in a position tightening the belt 50. By removing the pin 66 and rotating the eye-bolt 64 in its threaded socket, the toggle is lengthened or shortened to individually adjust the tension of each of the belts 50. Props 70 and 72 limit the movement of the toggle bracket through engagement with the opposite sides of the lever 58. The upper end 74 of the lever 58 has projecting portions 76 and 78 which function as pick-up stops for the lower ends of the forked portion of the steering handle structure 80 which are supported for pivotal movement upon the pins 62.

To enable the belts 40 and 42 to be tightened, the structure in which the jack shaft 32 is supported from the side frames 16 and 18 is shown as taking the form of plates 82 slotted at 84 and having pivotal connections at 86 with the side frames. A stud 88 connected in each side frame and passing through each slot 84 functions to clamp the plate 82 in different positions of adjustment upon tightening down nuts 90 upon the studs 88.

As in the case of my copending application, Serial No. 191,913, now Patent No. 2,151,659, above mentioned, it is one of the features of the present invention to selectively control the driving of the ground wheels 44 through manipulation of the steering handle structure 80 without placing any interference or restriction upon the pivotal movement of the handle structure when the same is being used solely for steering purposes. This has been accomplished in the present disclosure by so designing the toggle bracket 54 that during the period of pivotal movement of the handle structure 80 for steering purposes only there will be no operative engagement between the handle structure and the toggle bracket 54. In other words, the portions of the handle structure disposed between the projections 76 and 78 have sufficient clearance to enable the handle structure to be pivoted through the normal range required in steering the lawn mower over rough or uneven ground without interference or operative engagement therewith. When it is desired to drive the ground wheels from the jack shaft 32, elevation of the handle structure will effect engagement with the upper projection 76, rocking the lever 78 of the toggle brackets 54 clockwise, as viewed in Fig. 1, to straighten out the toggles. This action will bodily shift the ground wheels 40 relatively to the jack shaft 30 to tighten the otherwise slightly loosened belts 50 to selectively drive the ground wheels. It will be understood that the weight of the cutter chassis is sufficient to collapse the toggles, slackening the belts 50 once the toggles are moved out of extended position. The resiliency of the belts 50 also assists in this movement. The tension of the spring 68 is preferably adequate to hold the toggles in an extended position, tightening the belts 50 under all conditions of power operation of the ground wheels, as well as to move the toggles into an extended position with something approaching a snap-in action as the toggles approach an extended position. To collapse the toggles, the handle structure 80 is lowered below the range usually required for steering purposes and engages with the projection 74 to rock the levers 58 of the toggle brackets 54 counter-clockwise, as viewed in Fig. 1. Following this initial rocking movement, the weight of the associated parts and the resiliency of the belts 50 will complete the collapse of the toggles, overcoming the tension of the spring 68.

It is anticipated that other arrangements for extending and collapsing the toggle brackets will readily occur to those skilled in the art and also arrangements other than a direct engagement between the handle structure and the toggle bracket will suggest themselves for actuating the latter upon movement of the handle structure. I have found that the use of a toggle is particularly advantageous in that the toggle not only accomplishes relative shifting between the ground wheels and the power take-off but at the same time, because of its inherent construction when in an extended position, functions as a lock for rigidly maintaining the parts in their shifted position. Moreover, the relatively light springs 68 are capable of exerting a very appreciable amount of force for tightening the belts 50 as the toggles are approaching extended positions.

In the driving arrangement shown in my aforesaid copending application the ground wheels are driven off the cutting reel shaft. If it is desired to change the relative speed by changing the diameters of the driving pulleys, an increase or decrease of driving speed of the ground wheels will necessarily result. While this effect could be overcome in theory by making an appropriate change in the selection of driving pulleys for the ground wheels, as a practical matter this is not always feasible. In the driving arrangement of the present disclosure, in which the jack shaft is employed, the speed of operation of the ground wheels and cutting reels may be varied independently of each other in view of the fact that they do not have the inter-relating drive of my copending application. This new arrangement is particularly desirable from the standpoint of manufacture in that specifications as to ground wheel and cutting reel speeds may be varied over wide ranges by merely selecting different diameters of pulleys for the power transmitting mechanisms.

Having thus described my invention, what I desire to secure by Letters Patent and claim is:

1. In a power lawn mower, a cutter chassis having a rotatable reel, a traction chassis having belt driven wheels, a belt drive for said cutting mechanism, a fixedly supported rotatable jack shaft, a prime mover for driving said jack shaft, power take-off pulleys on said jack shaft, belt drives for said ground wheels and cutter reel running over said pulleys, means supporting said jack shaft for adjustment in said cutter chassis from one fixed position to another, and means extending between said cutter chassis and said traction chassis for shifting said ground wheels relative to said cutter chassis for operating the belt drive between said jack shaft and ground wheels.

2. In a power lawn mower, a cutter chassis, a traction chassis, a shiftable connection between said chassis for effecting relative movement therebetween, a prime mover supported upon said cutter chassis, a jack shaft driven by said prime mover, a power take-off upon said jack shaft, a cutting reel upon said cutter chassis continuously driven having a belt drive from said power take-off, a second power take-off, a belt drive between said second power take-off and traction chassis, said belt drive between said second power take-off and said traction chassis being loosened and tightened upon relative shifting movement between said chassis, and means for relatively shifting said chassis.

3. In a power lawn mower, a traction chassis, a cutter chassis, shiftable means for supporting one of said chassis from the other, said means including a toggle bracket having one end of the toggle member connected to one chassis and the other end to the other chassis, actuated means for collapsing and extending said toggle to shift said chassis relative to each other, a pivoted steering handle for the mower, and means constituting a lost motion connection between said handle and said actuated means, whereby the latter may be actuated upon movement of said handle.

4. A power lawn mower, comprising side frames, a rotatable cutting reel supported in said side frames and having a rotatable shaft, ground wheels bodily movable relative to said side frames, a jack shaft supported at the forward end of said frame members in fixed relation to the side frames, a prime mover supported on said frame members, a driving connection between said prime mover and jack shaft for rotating the latter, a supporting structure for said ground wheels, a belt drive between said ground wheels and said jack shaft, and handle means under the control of the operator and connected to said supporting structure for raising and lowering said ground wheels relative to said jack shaft to tighten and loosen said belt drive for selectively driving said ground wheels.

5. In a power lawn mower, a driving member, a driven member, frame structure in which said members are supported for relative bodily movement, a belt running over said members adapted upon being tightened to drive said driven member from said driving member, means connected to said frame structure supporting said driven member for bodily movement relative to said driving member, including a toggle bracket, and mechanism under the control of the operator operatively connected to said toggle bracket for selectively collapsing and extending the toggle for tightening and loosening said belt.

6. In a power lawn mower, a driving member, a driven member, frame structure in which said members are supported for relative bodily movement, a belt for driving said driven member from said driving member, ground wheels with which said driven member is associated for unitary action, means supporting said ground wheels for bodily movement relative to said driving member to loosen and tighten said belt for selectively driving said ground wheels, said means including a toggle bracket, a pivoted handle for steering the mower over the ground, an actuated member associated with said toggle for extending and collapsing the same, and an operative connection between said handle and said actuated member for collapsing and extending said toggle upon movement of said handle.

7. A power lawn mower, comprising a cutting chassis, a traction chassis, a prime mover mounted upon said cutting chassis, a driving shaft upon said cutting chassis, a driven shaft upon said traction chassis, aligned pulleys upon said shafts, a belt loosely running over said pulleys with said traction chassis in one position and adapted to be tightened with said traction chassis in another position, means supporting said cutting chassis and traction chassis for relative bodily movement, said means including a toggle bracket, with the ends of the toggle having connections upon said cutting chassis, a part of said toggle bracket extending beyond the connection of said toggle with said cutting chassis and having a pair of spaced projections, a steering handle pivotally connected at its lower end and having a portion thereof disposed between said projections and adapted to engage the same upon pivotal movement in opposite directions, movement of said handle while engaging said projections extending and collapsing said toggle to shift said chassis relative to each other to selectively drive the traction chassis through the tightening and loosening of said belt.

8. A power lawn mower, comprising side frames, ground wheels supported in a chassis, a pair of toggle brackets having connections at the upper end of the toggle with said side frames and having connections at the lower ends with said ground wheel chassis, spring means acting upon said toggles in a direction tending to extend the same, cutting mechanism supported between said side frames, said side frames and associated structure being at least partly supported from said ground wheels through said toggles with the weight thereof tending to collapse said toggles, an actuated member adapted to be moved to collapse and extend said toggles, a pivoted handle, a lost motion connection between said handle and said actuated member for moving said actuated member in opposite directions upon pivotal movement of said handle in opposite directions for extending and collapsing said toggle, whereby said ground wheels are shifted, a prime mover supported from said side frames, and a driving mechanism including a belt drive for driving said ground wheels from said prime mover, said belt drive being loosened and tightened through the shifting movement of said ground wheels.

9. In a power lawn mower, a driving member, a driven member, frame structure in which said members are supported for relative bodily movement, a belt running over said members adapted upon being tightened to drive said driven member from said driving member, and means supporting said driven member for bodily movement relative to said driving member, said means including a toggle, one of the links of said toggle being axially adjustable to shorten or lengthen the overall length of said toggle in an extended position, whereby the tension of said belt may be regulated, and manually actuated means operatively connected to said toggle for collapsing and extending the same to selectively drive said driven member from said driving member.

TRUMAN B. FUNK.